United States Patent [19]
McCann et al.

[11] Patent Number: 5,642,026
[45] Date of Patent: Jun. 24, 1997

[54] WINDSHIELD WIPER SYSTEM HAVING REDUCED WIPE SPEED AT REVERSAL POINTS USING VARIABLE FREQUENCY INDUCTION MOTOR CONTROL

[75] Inventors: Roy Alan McCann; John Riden Suriano, both of Kettering; Keith Richard Cook, Beavercreek, all of Ohio

[73] Assignee: ITT Automotive Electrical Systems, Inc., Auburn Hills, Mich.

[21] Appl. No.: 316,684

[22] Filed: Sep. 30, 1994

[51] Int. Cl.[6] .................................................. H02P 1/04
[52] U.S. Cl. .......................... 318/806; 318/444; 318/467; 318/468; 318/254
[58] Field of Search .............................. 318/443, 444, 318/445, 466–469, 484, DIG. 2, 254, 806; 388/805, 814, 832

[56] References Cited

U.S. PATENT DOCUMENTS

| | | | |
|---|---|---|---|
| Re. 33,848 | 3/1992 | Shiraishi | 318/444 |
| 4,514,669 | 4/1985 | Ecole | 318/443 |
| 4,578,591 | 3/1986 | Floyd et al. | |
| 4,585,980 | 4/1986 | Gille et al. | |
| 4,614,903 | 9/1986 | Betsch et al. | 318/443 |
| 4,663,575 | 5/1987 | Juzswik et al. | 314/444 |
| 4,664,575 | 5/1987 | Juzswik et al. | |
| 4,665,488 | 5/1987 | Graham et al. | |
| 4,705,997 | 11/1987 | Juzswik | 318/443 X |
| 4,705,998 | 11/1987 | Millerd et al. | |
| 4,827,198 | 5/1989 | Mueller et al. | 318/483 |
| 4,843,296 | 6/1989 | Tanaka | 318/800 |
| 4,881,019 | 11/1989 | Shiraishi et al. | 318/68 |
| 4,916,374 | 4/1990 | Schierbeek et al. | |
| 4,956,591 | 9/1990 | Schierbeek et al. | |
| 4,975,979 | 12/1990 | Baird | 388/814 |
| 5,059,877 | 10/1991 | Teder | |
| 5,117,168 | 5/1992 | Nomura et al. | |
| 5,140,233 | 8/1992 | Wallrafen | |
| 5,140,234 | 8/1992 | Wallrafen | |
| 5,157,312 | 10/1992 | Wallrafen et al. | |
| 5,216,341 | 6/1993 | Nomura et al. | |
| 5,252,897 | 10/1993 | Porter et al. | 318/443 |
| 5,254,916 | 10/1993 | Hopkins | |
| 5,355,061 | 10/1994 | Forhan | 318/254 X |
| 5,363,028 | 11/1994 | Mori | 318/254 X |
| 5,386,111 | 1/1995 | Zimmerman | |
| 5,397,991 | 3/1995 | Rogers | |
| 5,404,085 | 4/1995 | Resch et al. | |
| 5,504,406 | 4/1996 | Shultz et al. | 318/443 |

FOREIGN PATENT DOCUMENTS

| | | |
|---|---|---|
| 3208121A1 | 9/1983 | Germany |
| 4039038A1 | 6/1992 | Germany |

*Primary Examiner*—Brian Sircus
*Attorney, Agent, or Firm*—Thomas N. Twomey; J. Gordon Lewis

[57] ABSTRACT

A windshield wiper system having variable frequency induction motor control for reducing wipe speed at reversal points includes an induction motor, a wiper and blade assembly operatively connected to the motor, a sensing means for detecting when the position of the wiper and blade assembly is within a preselected range of one of the reversal points, and a motor control responsive to the control signal generated by the sensing means for causing the motor to reduce wipe speed during the preselected range prior to the reversal point to reduce pattern growth, noise, and water expulsion. The sensing means takes the form of a cam or plate operated switch driven by the induction motor. The control signal derived from the cam operated switch is provided as an input to a voltage controlled oscillator, whose variable frequency output is used to vary the frequency of the excitation voltage applied to the windings of the three phase induction motor.

22 Claims, 1 Drawing Sheet

WINDSHIELD WIPER SYSTEM HAVING REDUCED WIPE SPEED AT REVERSAL POINTS USING VARIABLE FREQUENCY INDUCTION MOTOR CONTROL

TECHNICAL FIELD

This invention relates generally to systems and methods of windshield wiper control and more particularly, but not by way of limitation, to windshield wiper systems and methods of operation thereof having reduced wipe speeds at reversal points using variable frequency induction motor control.

BACKGROUND OF THE INVENTION

Windshield wiper systems of the type in which the windshield wiper blade direction is reversed (e.g., tandem, symmetrical overlap, single arm, single extending arm) are widely known and included as standard equipment on nearly every automobile manufactured. Maintenance of a constant wipe speed, or even an acceleration thereof, through reversal points (i.e., a point where the wiper arm and blade direction is reversed at an inner and outer wipe position) produces several undesirable effects, including wipe pattern or angle growth, increased production of noise, and increased expulsion of water from the vehicle windshield. Due to inertial effects, and other factors (e.g., the relatively "loose coupling" between a wiper motor and the wiper arm and blade assembly), the wiper arm and blade, at high-speed operation, tends to travel past a nominal reversal point, thus increasing the wipe angle or pattern. When the wiper arm and blade travel past the nominal reversal point to an extent that it contacts a windshield pillar, for example, the resulting "slap" or contact produces undesirable noise. Further, the high speed of the wiper arm and blade assembly through reversal points results in water being thrown a distance from the vehicle. Although not a safety concern, such excess water expulsion adversely impacts consumer perception of the vehicle including such a windshield wiper system.

Therefore, there is a need to provide an improved windshield wiper system and method of operation that minimizes or eliminates one or more of the problems as set forth above.

SUMMARY OF THE INVENTION

This invention provides for decreased noise, expulsion of water, and wipe pattern or angle growth by, in part, reducing the inertial effects at reversal points through slowing of the wiper motor speed for a portion of the wipe pattern containing the reversal point. In general, the system of this invention having reduced wipe speed at reversal points includes a motor, a wiper assembly operatively connected to the motor for motion when the motor is operated, a sensing means responsive to a position of the wiper assembly, and a motor control. The sensing means detects when the wiper assembly is positioned within a preselected range of at least one reversal point. The sensing means also generates a control signal whose state depends on whether the wiper assembly is within the above-mentioned range. The motor control is responsive to the control signal and is operative to cause the motor to move the wiper assembly at a first wipe speed when the control signal is in a first state, corresponding to when the wiper assembly is out of the above-mentioned range. The motor control is further operative to cause the motor to move the wiper assembly at a second wipe speed when the control is signal is in an second state, corresponding to when the wiper assembly is within the above-mentioned range. The second wipe speed is less than the first wipe speed, thus effecting a reduced wipe speed through the reversal point to overcome the above-mentioned problems inherent in prior art wiper systems.

In a preferred embodiment of the present invention, the sensing means includes a position sensor for sensing the position of the wiper assembly comprising a cam or plate responsive to the motion of the wiper assembly for actuating a switch within the above-mentioned range and wherein the control signal is generated as a function of the state of the switch. The motor control includes a frequency modulator (preferably a voltage controlled oscillator) responsive to the control signal for generating a first signal having a first, higher frequency when the control signal is in the first state (when the wiper assembly is not within the above-mentioned range), and for generating a second signal having a second, lower frequency, when the control signal is in the second state (when the wiper assembly is within the above-mentioned range). The induction motor operates at a speed that is proportional to the first and second signals.

A further aspect of the present invention includes a method for operating a wiper system. The method comprises the steps of: (A) moving a wiper assembly at a first wipe speed; (B) detecting when the wiper assembly is within a preselected range of at least one reversal point; and (C) moving the wiper assembly at a second wipe speed when the preselected range is detected, the second wipe speed being less than the first wipe speed. In a preferred embodiment, the step of moving the wiper assembly at a first wipe speed is performed by the substeps of generating a control signal in a first state; generating a first signal having a first frequency using the control signal in the first state; and exciting an induction motor operatively coupled to move the wiper assembly with an excitation voltage having a frequency that is proportional to the first frequency using the first signal.

These and other features and objects of this invention will become apparent to one skilled in the art from the following detailed description and the accompanying drawings illustrating features of this invention byway of example.

BRIEF DESCRIPTION OFT HE DRAWINGS

DETAILED DESCRIPTION OF THE PREFERRED EMBODIMENTS

Figure 1:
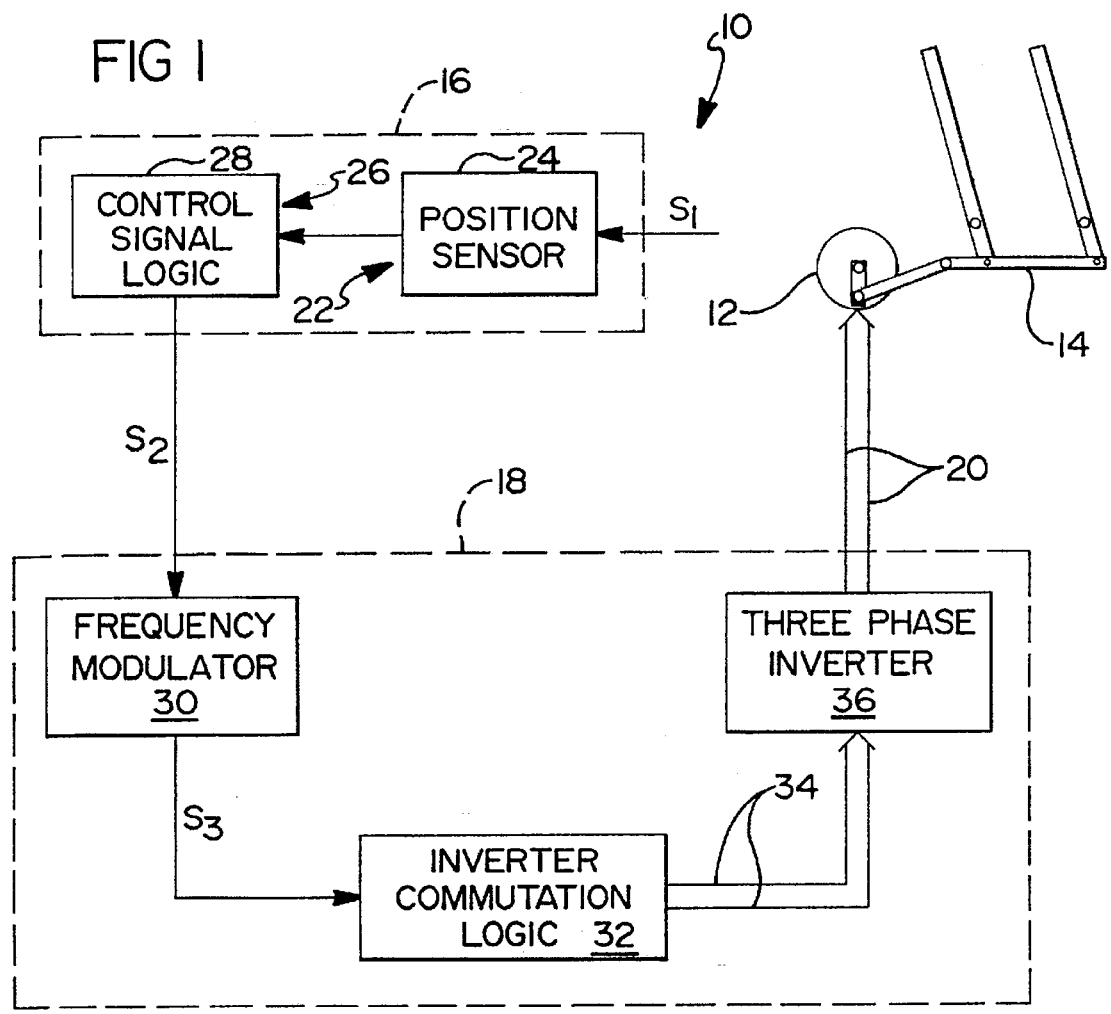
FIG. 1 is a partial diagrammatic and block view of a wiper system in accordance with the present invention, including a wiper assembly, sensing means and a motor control.

FIG. 1 shows a partial diagrammatic and block diagram of a windshield wiper system 10 in accordance with the present invention. Wiper system 10 includes a motor 12 whose output speed varies with the frequency of an input excitation voltage. System 10 further includes wiper and blade assembly 14 (hereinafter the "wiper assembly" 14) operatively connected to motor 12 for periodic motion when motor 12 is operated. The system 10 further includes sensing means 16 responsive to a position of wiper assembly 14, as shown by input signal $S_1$, and is provided for detecting when wiper assembly 14 is positioned within a preselected range of at least one reversal point and for generating control signal $S_2$. System 10 further includes motor control and drive circuitry 18 (hereinafter the "motor control" 18) responsive to control signal $S_2$ for varying the frequency of motor drive signals 20.

Motor 12 is preferably a three phase induction motor. Operating characteristics of induction motor 12 include an operation speed that is proportional to the frequency of the input or excitation voltage applied to each of the three phase windings of the motor (not illustrated) via drive signals 20. Thus, voltage magnitude variations in the excitation frequency of signals 20 do not practically effect the speed at which the motor 12 operates. Accordingly, varying the frequency of the excitation voltage of signals 20 produces a corresponding change in the speed of operation of motor 12.

Wiper assembly 14 is of the type in which the direction of blade movement is reversed (e.g., tandem, symmetrical overlap, single arm, single extending arm). Wiper assembly 14 is operatively connected, for example, by a linkage (not illustrated), to motor 12 for periodic motion when motor 12 is operated. Preferably, motor 12 is connected to wiper assembly 14 such that one revolution of motor 12 results in a complete wipe cycle of assembly 14. The wipe pattern of wiper assembly 14 includes reversal points (i.e., points where blade direction reversals occur in an outer and inner wipe position). Thus, wiper assembly 14 traverses a closed path in response to operation of motor 12, which is repeated so long as motor 12 is operated.

Sensing means 16 includes a position sensor 22 for sensing the position of wiper assembly 14, and preferably comprises a cam or plate operated switch 24. Cam operated switch 24 is responsive to the motion of the wiper assembly 14 for actuating the switch when the wiper assembly enters an area prior to a reversal point. Preferably, switch 24 is disposed proximate the cam or plate which is mounted to rotate in accordance with the rotation of motor 12. Since the rotation of motor 12 corresponds to the sweep pattern of the wipe cycle, the angular position of motor 12 can be used to detect the position of wiper assembly 14 relative to the reversal point.

It should be appreciated that in theory, controlling the movement of wiper assembly 14 to a slower speed in a range prior to the reversal point is all that is required to minimize or reduce the problems associated with prior art wiper systems; however, in practicality, it has been found advantageous to maintain a slower speed of wiper assembly 14 for a small range after wiper assembly 14 has travelled through one of the reversal points. This small range allows for manufacturing and other assembly process tolerance variations so that a reduced wipe speed of wiper assembly 14 will be maintained until wiper assembly 14 has in fact passed one of the reversal points.

Sensing means 16 further includes control signal logic 26 which is responsive to the state of switch 24 for generating control signal $S_2$. Logic 26 functions to convert the state of switch 24 to a voltage, and then to process this voltage signal to generate a signal $S_2$ whose voltage is proportional to the desired wiper assembly 14 speed (and, accordingly, motor 12 speed as well). Preferably, control signal logic 26 comprises switch signal conversion logic 28 which produces signal $S_2$ as either a logic "1" (a first state) or logic "0" (a second state) depending on the state of switch 24, although it should be appreciated that the voltage levels (magnitude) for each of the two states of signal $S_2$ may be selected from a range of values, not necessarily well known logic "0" (0 volts) and logic "1" (5 volts) voltage levels.

It should be further appreciated that switch 24 may be configured to be either open or closed when wiper assembly 14 is within the preselected range of a reversal point. Correspondingly, logic 28 may be configured to produce either of the two states of signal $S_2$ for either state (e.g., open/closed) of switch 24 (i.e., $S_2$ has two states, but the magnitude of $S_2$ at each state corresponds as follows: (1) The magnitude of $S_2$ corresponds to a relatively higher frequency excitation of motor 12 when switch 24 indicates that wiper assembly 14 is outside of the preselected range, and (2) the magnitude of $S_2$ corresponds to the relatively lower frequency excitation of motor 12 when switch 24 indicates that wiper assembly 14 is within the preselected range). Such modifications are well within the ambit of one of ordinary skill in the art.

Alternatively, position sensor 22 may comprise a variable resistance device which provides continuous information regarding the position of wiper assembly 14 throughout the preselected range; accordingly, in this embodiment, logic 28 may be configured to produce a control signal $S_2$ that has a plurality of states continuously variable depending upon the position of wiper assembly 14.

Motor control 18 includes a frequency modulator 30 responsive to control signal $S_2$ for generating signal $S_3$, which varies in frequency and is proportional to the desired wiper assembly 14 speed (and, accordingly, motor 12 speed). Signal $S_3$ is characterized by a first frequency when control signal $S_2$ is in a first state (corresponding to when wiper assembly 14 is not within the preselected range), and a second, relatively lower frequency when control signal $S_2$ is in its second state (corresponding to when wiper assembly 14 has entered a preselected range before a reversal point). Preferably, frequency modulator 30 comprises a voltage controlled oscillator, such as may be found, functionally, on commercially available component LM565.

Motor control 18 further includes inverter commutation logic 32, which is responsive to variable frequency signal $S_3$, for generating timing and drive signals 34 which are fed to three phase inverter 36. Commutation logic 32 and three phase inverter 36 are functional blocks well known in the art; however, briefly described, inverter commutation logic 32 in the preferred embodiment, generates, in conventional timed relationship (i.e., three signals overlapping each other by 120°), timing signals for each one of the three phases of induction motor 12. Three phase inverter 36 connects and disconnects, to a power source (not illustrated), each phase winding of motor 12 in accordance with timing signals 34. It should be appreciated that three phase inverter 36 may take many forms (e.g., full-wave, half-wave, etc.). For example, in a preferred environment for system 10, the power source comprises an automotive DC voltage battery (not illustrated). Three phase inverter 36 connects this positive DC voltage for part of a cycle, and subsequently reverses the polarity of the battery as applied to the winding for the remainder of the cycle. It should be appreciated that there are a plurality of configurations for the commutation logic 32/inverter 36 combination.

The operation of system 10 may be advantageously illustrated by reference to FIG. 2. Wiper assembly 14 moves in a periodic and reciprocal path or pattern, simplified and modeled for purposes of illustration only by circle 38. In operation, wiper assembly 14 begins from rest at point a, and proceeds at a first wipe speed through point b. In the preferred embodiment, switch 24 is not yet actuated; accordingly, control signal $S_2$ is in a first state based on switch 24. Frequency modulator 30, in response to control signal $S_2$ (in the first state), produces signal $S_3$ having a relatively higher first frequency. Signal $S_3$ propagates through commutation logic 32 and inverter 36 to drive motor 12 at a speed proportional to the first frequency of signal $S_3$, and thus moves wiper assembly 14 at the first wipe speed (proportional also to the frequency of $S_3$).

As wiper assembly enters a preselected range prior to a reversal point 40, designated as point c on path 38, switch 24 is actuated, thus causing control signal $S_2$ to change state to a second state. Frequency modulator 30, in response to control signal $S_2$ (in the second state), produces signal $S_3$ having a second relatively lower frequency, which is less than the first frequency of signal $S_3$. Now, lower frequency signal $S_3$ propagates through commutation logic 32/inverter 36 to operate motor 12 at a speed proportional to the second frequency of signal $S_3$ to move wiper assembly 14 at the second wipe speed (also proportional to the second frequency of $S_3$), which is slower than the above-mentioned first wipe speed. The preselected range prior to reversal point 40, noted by are length A in FIG. 2, is system dependent for optimal operation. However, for purposes of illustration only, this range may be approximately 15 to 30 degrees, based on a General Motors Astrovan-type windshield wiper system.

As the position of wiper assembly 14 moves past reversal point 40, at the second wipe speed, to point d, full speed (i.e., the first wipe speed) is again theoretically desired. However, due to manufacturing tolerances discussed above, a guard band, noted as are length B, as shown in FIG. 2, is practically required so that system 10 will not command full speed until wiper assembly 14 has in-fact passed reversal point 40.

As wiper assembly 14 moves from position d to position e, switch 24 is no longer actuated based on the position of wiper assembly 14, and control signal $S_2$ resumes its first state, and accordingly, frequency modulator 30 produces signal $S_3$ having a first, relatively higher frequency. This higher frequency signal $S_3$ propagates through commutation logic 32/inverter 36 to operate motor 12 and move wiper assembly 14 at the first wipe speed.

Figure 2:
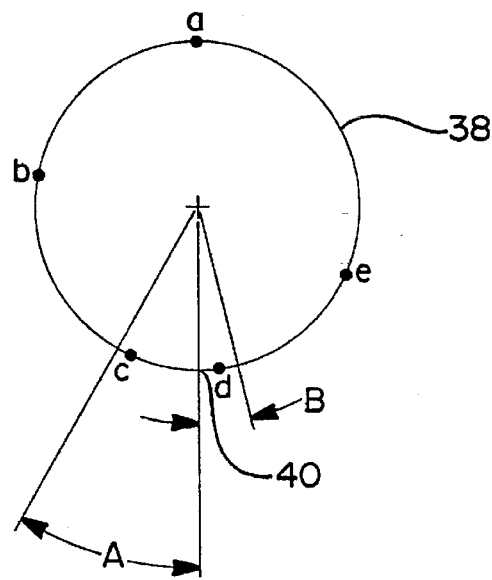
FIG. 2 is a diagrammatic model representation depicting the motion around an illustrative unit circle of the wiper assembly shown in FIG. 1, including a range prior to a reversal point in which the wipe speed of the wiper assembly is reduced.

It should be understood that a preferred embodiment of system 10 includes an in-wipe reversal point, in addition to the above-described out-wipe reversal point 40, as shown in FIG. 2. Moreover, due to inertial effects, maximum wipe speed occurs during mid-wipe going from rest to the out-wipe reversal point; the minimum wipe speed occurring near a full out-wipe position of wiper assembly 14 (near point 40). Maximum wiper assembly 14 speed also occurs during the mid-wipe portion of the wipe pattern going from the out-wipe reversal point 40 to the in-wipe reversal point (i.e., rest position).

A windshield wiper system employing variable frequency induction motor control provides the advantage of controlling motor speed, and accordingly wiper assembly speed, independent of voltage magnitude variations of the vehicle power source (e.g., battery). Thus, the improvements over the prior art, including, without limitation, the features of reduced noise, pattern growth, water expulsion, will be sustained notwithstanding changes in the vehicle battery voltage over typical operating conditions of a vehicle alternator. In addition, characteristics of the induction motor (i.e., the constant speed versus motor torque), allow the herein described method to be substantially invariant to changes in system 10 due to component aging and temperature variations.

The proceeding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

What is claimed is:

1. A wiper system having reduced wipe speed at reversal points, comprising:

an induction motor;

a wiper assembly operatively connected to said motor for motion when said motor is operated;

sensing means responsive to a position of said wiper assembly for detecting the position of said wiper assembly and generating a control signal when said wiper assembly is positioned within a preselected range of at least one reversal point;

a motor control responsive to said control signal for causing said motor to operate said wiper assembly at a first wipe speed when said control signal is in a first state, said motor control being operative to cause said motor to operate said wiper assembly at a second wipe speed when said control signal is in a second state wherein said second wipe speed is less than said first wipe speed, said motor control including a frequency modulator responsive to said control signal for generating a first signal having a first frequency when said control signal is in said first state, and for generating a second signal having a second frequency when said control signal is in said second state, said first and second signals being coupled to said motor to operate said wiper assembly at said first and second wipe speeds, respectively.

2. The system of claim 1, wherein said sensing means includes a position sensor for sensing the position of said wiper assembly, said position sensor comprising a cam responsive to the motion of said wiper assembly for actuating a switch when said wiper assembly is positioned within said preselected range, wherein said control signal is generated as a function of a state of said switch.

3. The system of claim 1, wherein said sensing means includes a position sensor for sensing the position of said wiper assembly, said position sensor comprising switch plate means responsive to the motion of said wiper assembly for actuating a switch when said wiper assembly is positioned within said preselected range, wherein said control signal is generated as a function of a state of said switch.

4. The system of claim 1, wherein said frequency modulator includes a frequency controlled oscillator.

5. The system of claim 1 wherein said preselected range includes a guard band occurring after said reversal point.

6. The wiper system of claim 1 wherein said first signal alternates between positive polarity and negative polarity at said first frequency and said second signal alternates between positive polarity and negative polarity at said second frequency.

7. A method of operating a wiper system, comprising the steps of:

(A) moving a wiper assembly at a first wipe speed;

(B) detecting when the wiper assembly is within a preselected range of at least one reversal point; and, (C) moving the wiper assembly at a second wipe speed when said preselected range is detected wherein the second wipe speed is less than the first wipe speed by performing the substeps of:

generating a control signal in a first state;

generating a first signal having a first frequency using the control signal in the first state;

exciting an induction motor operatively coupled to move the wiper assembly with an excitation voltage having a frequency that is proportional to the first frequency using the first signal wherein said second wipe speed corresponds to said first frequency.

8. The method of claim 7, wherein step (A) includes the substeps of:

generating the control signal in a second state;

generating a second signal having a second frequency using the control signal in the second state;

exciting the induction motor operatively coupled to move the wiper assembly with excitation voltage having a frequency that is proportional to the second frequency using the second signal wherein said first wipe speed corresponds to said second frequency.

9. The method of claim 8 wherein said substep of exciting the induction motor using the second signal includes the further substep of:

alternating said excitation voltage between positive polarity and negative polarity at said second frequency.

10. The method of claim 7 wherein said preselected range includes a guard band occurring after said reversal point.

11. The method of claim 7 wherein said exciting step includes the substeps of:

alternating said excitation voltage between positive polarity and negative polarity at said first frequency.

12. A wiper system having reduced wipe speed at reversal points, comprising:

an induction motor;

a wiper assembly operatively connected to said motor for motion when said motor is operated;

sensing means responsive to a position of said wiper assembly for detecting when said wiper assembly is positioned within a preselected range of at least one reversal point and for generating a control signal in a first state when said wiper assembly is outside of said preselected range, and a control signal in a second state when said wiper assembly is within said preselected range; and, frequency varying means responsive to said control signal for exciting said motor with an excitation voltage having a first frequency when said control signal is in a first state wherein said motor moves said wiper assembly at a first wipe speed, said frequency varying means being operative to excite said motor with excitation voltage having a second frequency when said control signal is in a second state wherein said motor moves said wiper assembly at a second wipe speed, said second wipe speed being less than said first wipe speed.

13. The system of claim 12, wherein said frequency varying means includes a voltage controlled oscillator operative to generate a signal that varies in frequency as a function of the state of the control signal.

14. The system of claim 12 wherein said preselected range includes a guard band occurring after said reversal point.

15. The system of claim 12 wherein said excitation signal alternates between positive polarity and negative polarity at said first frequency when said control signal is in said first state, and said excitation signal alternates between positive polarity and negative polarity at said second frequency when said control signal is in said second state.

16. A method for controlling the speed of a wiper in a vehicle windshield wiper system that includes an induction motor for moving the wiper through a wiper pattern, comprising the steps of:

(A) determining the position of the wiper relative to a reversal point of the wiper pattern;

(B) defining a range about the reversal point wherein the wiper speed is reduced relative to the remainder of the pattern;

(C) defining a condition when the position from step (A) is within the range from step (B); and, (D) varying a frequency of an excitation voltage applied to the induction motor when the condition in step (C) is met to thereby control the speed of the wiper.

17. The method of claim 16 wherein step (B) includes the substep of;

defining the range to include a guard band occurring past the reversal point.

18. The method of claim 16 wherein the range and the wiper speed are controlled to reduce an amount of water expulsion by the wiper to a desired level.

19. The method of claim 16 wherein the range and the wiper speed are controlled to reduce an amount of noise generated by operation of the wiper to a desired level.

20. The method of claim 16 wherein the range and the wiper speed are controlled to reduce an amount of pattern growth to a desired level.

21. The method of claim 16 wherein step (D) is performed by the substep of decreasing the frequency of the excitation voltage to thereby decrease the speed of the wiper.

22. The method of claim 16 wherein said varying step includes the substep of:

alternating said excitation voltage between positive polarity and negative polarity at said varied frequency.

* * * * *